US009247008B2

(12) United States Patent
Narayanan et al.

(10) Patent No.: US 9,247,008 B2
(45) Date of Patent: Jan. 26, 2016

(54) UNIFIED WEB SERVICE DISCOVERY

(75) Inventors: Ranjith Narayanan, Bellevue, WA (US); Rui Liang, Sammamish, WA (US); Srivatsa Srinivasan, Renton, WA (US)

(73) Assignee: Microsoft Corporation, Redmond, WA (US)

(*) Notice: Subject to any disclaimer, the term of this patent is extended or adjusted under 35 U.S.C. 154(b) by 568 days.

(21) Appl. No.: 12/726,854

(22) Filed: Mar. 18, 2010

(65) Prior Publication Data
US 2011/0231473 A1 Sep. 22, 2011

(51) Int. Cl.
*G06F 15/16* (2006.01)
*H04L 29/08* (2006.01)
*H04L 29/06* (2006.01)

(52) U.S. Cl.
CPC .............. *H04L 67/16* (2013.01); *H04L 63/168* (2013.01); *H04L 67/02* (2013.01); *H04L 67/28* (2013.01); *H04L 63/08* (2013.01)

(58) Field of Classification Search
USPC ........................................................ 709/203
See application file for complete search history.

(56) References Cited

U.S. PATENT DOCUMENTS

| | | | | |
|---|---|---|---|---|
| 6,496,931 B1 * | 12/2002 | Rajchel | .................. | H04L 29/06 713/168 |
| 6,604,132 B1 * | 8/2003 | Hitt | ...................... | G06Q 10/107 382/101 |
| 7,174,564 B1 * | 2/2007 | Weatherspoon | .... | H04L 63/0272 709/225 |
| 7,194,543 B2 * | 3/2007 | Robertson | .............. | G06Q 10/06 709/223 |
| 7,366,460 B2 | 4/2008 | O'Farrell et al. | | |
| 7,475,123 B2 | 1/2009 | Schwarze | | |
| 7,587,598 B2 * | 9/2009 | Ohba | ...................... | H04L 63/08 380/270 |
| 7,725,590 B2 * | 5/2010 | Sedukhin | ............... | G06Q 40/00 705/35 |
| 7,853,643 B1 * | 12/2010 | Martinez | ................. | H04L 29/06 709/201 |
| 7,966,487 B2 * | 6/2011 | Engberg | ................ | H04L 9/3247 713/155 |
| 8,082,294 B2 * | 12/2011 | Krahulec | .......... | G06F 17/30893 707/999.01 |
| 2002/0055924 A1 | 5/2002 | Liming | | |
| 2003/0126079 A1 | 7/2003 | Roberson et al. | | |
| 2003/0144894 A1 * | 7/2003 | Robertson | .............. | G06Q 10/06 709/226 |
| 2005/0259654 A1 * | 11/2005 | Faulk, Jr. | .......... | H04L 29/12009 370/392 |

(Continued)

FOREIGN PATENT DOCUMENTS

| | | |
|---|---|---|
| CH | 02196035 A | 9/2011 |
| CN | 1705940 A | 12/2005 |
| CN | 101014945 A | 8/2007 |

OTHER PUBLICATIONS

Pantazoglou et al., The Unified Service Query Language Technical Report—Published Date: Jul. 19, 2009; 18 pages http://www.s3lab.com/papers/acmtweb09.pdf.

(Continued)

*Primary Examiner* — Hamza Algibhah
*Assistant Examiner* — James Edwards

(57) ABSTRACT

A uniform approach for web service discovery is provided through common auto-discovery logic for cloud-based or enterprise-based deployments for a specific web service. Appropriate credentials may be applied employing a uniform method using an appropriate authentication scheme for on-premise, fully hosted, or partially hosted auto-discovered web services. A common interface may be implemented even if the protocols for discovery differ from service to service or between cloud-based deployment and enterprise-based deployment for the same service. Web service locations auto-discovered through different protocols may be cached for subsequent use.

18 Claims, 7 Drawing Sheets

(56) References Cited

U.S. PATENT DOCUMENTS

| | | | |
|---|---|---|---|
| 2006/0136419 | A1 | 6/2006 | Brydon et al. |
| 2008/0052364 | A1* | 2/2008 | Zhou ................. H04L 51/28 709/206 |
| 2008/0162651 | A1* | 7/2008 | Madnani ........... G06Q 10/107 709/206 |
| 2008/0211624 | A1* | 9/2008 | Micali .................. H04L 9/007 340/5.6 |
| 2008/0301784 | A1* | 12/2008 | Zhu ................... H04L 63/0823 726/5 |
| 2011/0061086 | A1* | 3/2011 | Huang ........... H04N 21/234309 725/110 |
| 2011/0113435 | A1* | 5/2011 | Angelov ............... H04L 67/02 719/313 |
| 2011/0231899 | A1* | 9/2011 | Pulier ................. G06F 9/45558 726/1 |

OTHER PUBLICATIONS

Pantazoglou et al., A Unified Approach for the Discovery of Web and Peer-to-Peer Services—Published Date: 2006, http://ieeexplore.ieee.org/Xplore/login.jsp?url=http%3A%2F%2Fieeexplore.ieee.org%2Fiel5%2F4031979%2F4031980%2F04032111.pdf%3Farnumber%3D4032111&authDecision=-203.

Sample et al., Enhancing the US Navy's GIDB Portal with Web Services—Published Date: Oct. 2006, 8 pages http://ieeexplore.ieee.org/stamp/stamp.jsp?arnumber=01703345.

Martin et al., Semantic Web Services,Part 1—Published Date: 2007, 6 pages http://ieeexplore.ieee.org//stamp/stamp.jsp?tp=&arnumber=04338488.

Ramanathan et al., Auto-Discovery Capabilities for Service Management: An ISP Case Study—Published Date: May 1999, 19 pages http://www.hpl.hp.com/techreports/1999/HPL-1999-68.pdf.

Rasmussen et al. Short Paper: Improving the Responsiveness of Internet Services with Automatic Cache Placement—Published Date: Apr. 3, 2009, 6 pages http://cseweb.ucsd.edu/~arasmuss/papers/fluxo.pdf.

Pilioura et al., ACM Transactions on The Web, vol. 3, No. 3, Article 11, Publication date: Jun. 2009.Unified Publication and Discovery of Semantic Web Services.

"First Office Action and Search Report Issued in Chinese Application No. 201110072256.X", Mailed Date: Oct. 8, 2014, 15 Pages.

* cited by examiner

UNIFIED WEB SERVICE DISCOVERY

BACKGROUND

Web services are becoming more popular for client/server communication. Web services can be located on servers within an enterprise or online (hosted offering) and accessed by clients for a wide variety of operations. Document sharing, search, analysis, reporting, data mining are just a few examples of web services. Web service hosts may support different operations and/or authentication schemes. For example, a hosted server may support Web Service Security (WSS) protocol authentication scheme while an on-premise server may support mutual transport level security (MTLS) with client certificate.

Discovery mechanisms in the web world are disparate and various systems follow different standards. As enterprise clients need to interact with various web services, discovery of the different web services presents a challenge. Use of multiple interfaces may degrade user experience. Moreover, with cloud based services replacing some enterprise based services, a specific service may either be in the cloud or in the enterprise network. In such scenarios, the client may have to choose which service is be used.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a uniform approach for web service discovery through common auto-discovery logic for cloud-based or enterprise-based deployments for a specific web service. Appropriate credentials may be applied employing a uniform method using an appropriate authentication scheme for on-premise, fully hosted, or partially hosted auto-discovered web services. A common interface may be implemented even if the protocols for discovery differ from service to service or between cloud-based deployment and enterprise-based deployment for the same service. According to some embodiments, auto-discovered web service locations may be cached for subsequent use.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
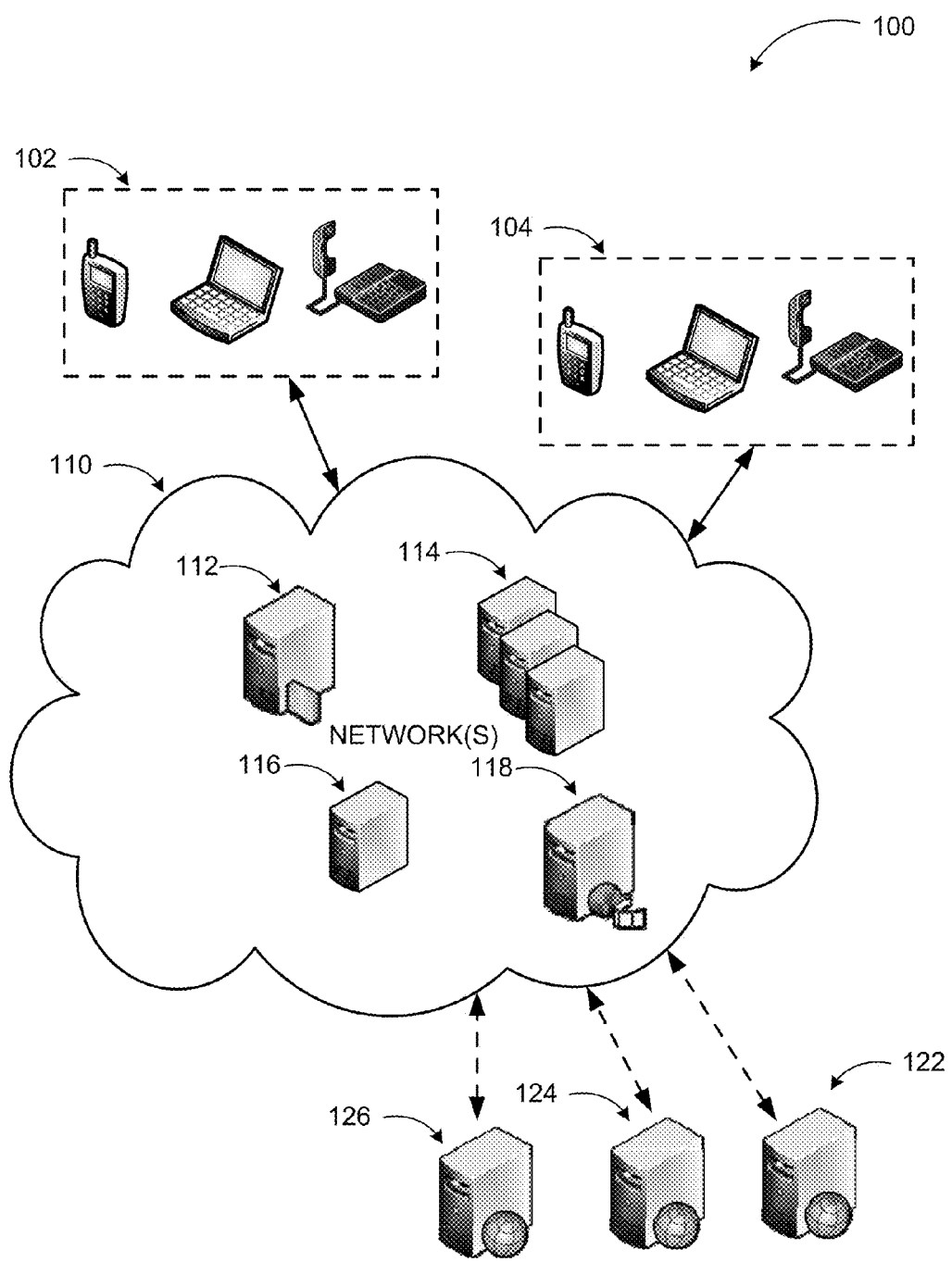
FIG. 1 is a diagram illustrating an example unified communications system, where embodiments may be implemented for unified web service discovery.

As briefly described above, a uniform approach may be employed for web service discovery through common auto-discovery logic for cloud-based or enterprise-based deployments for a specific web service. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing web services and related network communications. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes diagram 100 illustrating an example unified communications system, where embodiments may be implemented for unified web service discovery. A unified communication system is an example of modern communication systems with a wide range of capabilities and services (including web services) that can be provided to subscribers. A unified communication system is a real-time communications system facilitating instant messaging, presence, audio-video conferencing, web conferencing, and similar functionalities.

In a unified communication ("UC") system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also execute applications that facilitate various web services such as participation in social networks, web based document sharing, searches, and comparable ones. Furthermore, traditional phone calls and similar communications may also be facilitated by these client devices through an external connection such as through a PBX to a Public Switched Telephone Network ("PSTN"). Client devices may include any type of smart phone, cellular phone, any computing device executing a communication application, a smart automobile console, and advanced phone devices with additional functionality.

UC Network(s) 110 may include a number of servers performing different tasks. For example, UC servers 114 provide registration, presence, and routing functionalities. Routing functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, home servers providing presence functionality, routing servers providing routing functionality, and so on. Similarly, access server 112 may provide multiple functionalities such as firewall protection and connectivity, or only specific functionalities.

Audio/Video (A/V) conferencing server 118 provides audio and/or video conferencing capabilities by facilitating those over an internal or external network. Mediation server 116 mediates signaling and media to and from other types of networks such as a PSTN or a cellular network. Mediation server 116 may also act as a Session Initiation Protocol (SIP) user agent.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a commonly used method.

SIP is an application-layer control (signaling) protocol for creating, modifying, and terminating sessions with one or more participants. It can be used to create two-party, multi-party, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real Time Protocol ("RTP").

A UC system may provide a platform for social networking, multimodal enterprise communications, web-based sharing services, and similar environments. When a subscriber participates in such an environment, they may take advantage of web services managed by one or more external servers (e.g., 122, 124, and 126) or by one of the servers internal to the UC system. These services may be discoverable through a variety of standardized or proprietary mechanisms. In a system according to embodiments, a discovery module/application may be employed for automatically discovering available web services for a subscriber and providing web service information (location, authentication, operations, and the like) as metadata to consuming application(s) eliminating a need to individually discover the web services and to set up a separate discovery mechanism for each service manually. More detailed examples are discussed below.

While the example system in FIG. 1 has been described with specific components such as mediation server, A/V server, and similar devices, embodiments are not limited to these components or system configurations and can be implemented with other system configuration employing fewer or additional components. Functionality of systems employing unified web service discovery may also be distributed among the components of the systems differently depending on component capabilities and system configurations. Furthermore, embodiments are not limited to unified communication systems. The approaches discussed here may be applied to any data exchange in a networked communication environment using the principles described herein.

Figure 2:
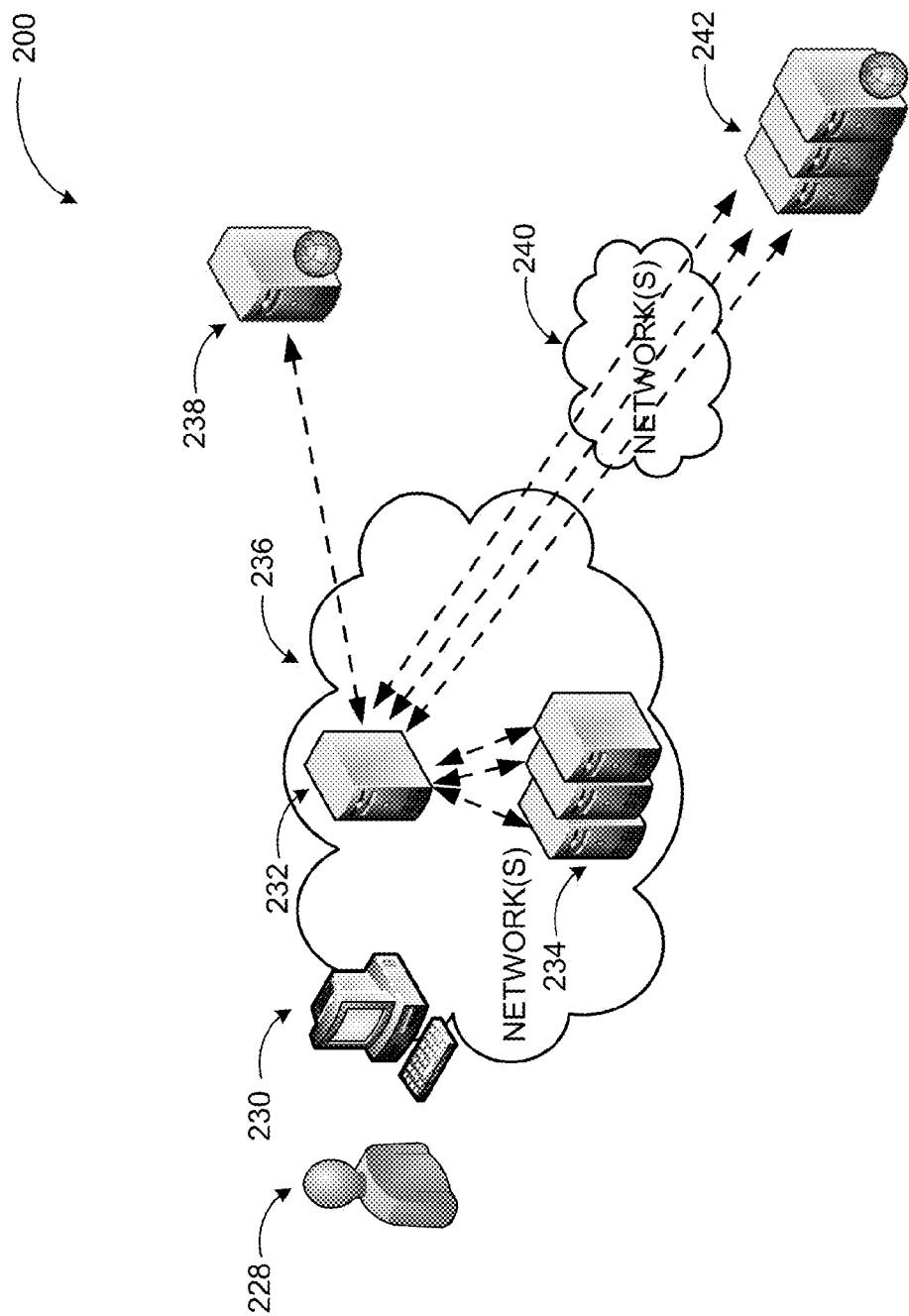
FIG. 2 is a conceptual diagram illustrating various components within a networked system implementing unified discovery of web services.

FIG. 2 is a conceptual diagram illustrating various components within a networked system implementing unified discovery of web services. As enterprise clients such as enhanced communication system clients provide an increasing number of web services, they interact with various web service providers. A system according to embodiments enables a single interface for discovering needed/available web services in a unified manner. With cloud-based services increasingly replacing enterprise-based services, particular services like Exchange® or Office Communicator Service® by Microsoft Corp. of Redmond, Wash. may reside in the cloud or within the enterprise network. In such cases, the client is provided with means to dynamically choose which service to use.

Moreover, various services may employ different standardized or proprietary methods for exposing themselves to the clients. Worldwide Web Consortium (W3C) based metadata exchange, Organization for the Advancement of Structured Information Standards (OASIS) based Universal Description Discovery and Integration (UDDI) are a couple example standardized methods.

In a system according to embodiments, as shown in diagram 200, user 228 may interact with a variety of web service providers through their client 230. Client 230 may refer to a computing device executing one or more applications, an application executed on one or more computing devices, or a service executed in a distributed manner and accessed by user 228 through a computing device. In a typical system client 230 may communicate with one or more servers (e.g., server 232) managing communications within a network 236 of the client. Some of the web services may be provided through resources available on server 232. Other web services may be provided through resources available on servers 234 internal to the network 236. Yet other web services may be provided by individual servers (e.g. server 238 external to the network or distributed servers 242, which may be accessed through one or more additional networks (e.g. network(s) 240).

According to one example scenario, server 232 may facilitate a multimodal communication service such as a unified communication service. Another server (e.g. one of servers 234) may facilitate a directory and/or data source service for communication/calendar/scheduling applications. If network 236 is an enterprise network and both servers according to the example scenario are within the network, this architecture may be referred to as on-premise deployment. If both server are hosted online (in the cloud), the configuration may be referred to as fully hosted. If one of the servers is within the enterprise network, but the other is hosted, the configuration may be called partially hosted. According to other scenarios, some users may be serviced by on-premise servers while others are serviced by hosted servers. That architecture may be referred to as cross-premise deployment.

Figure 3:
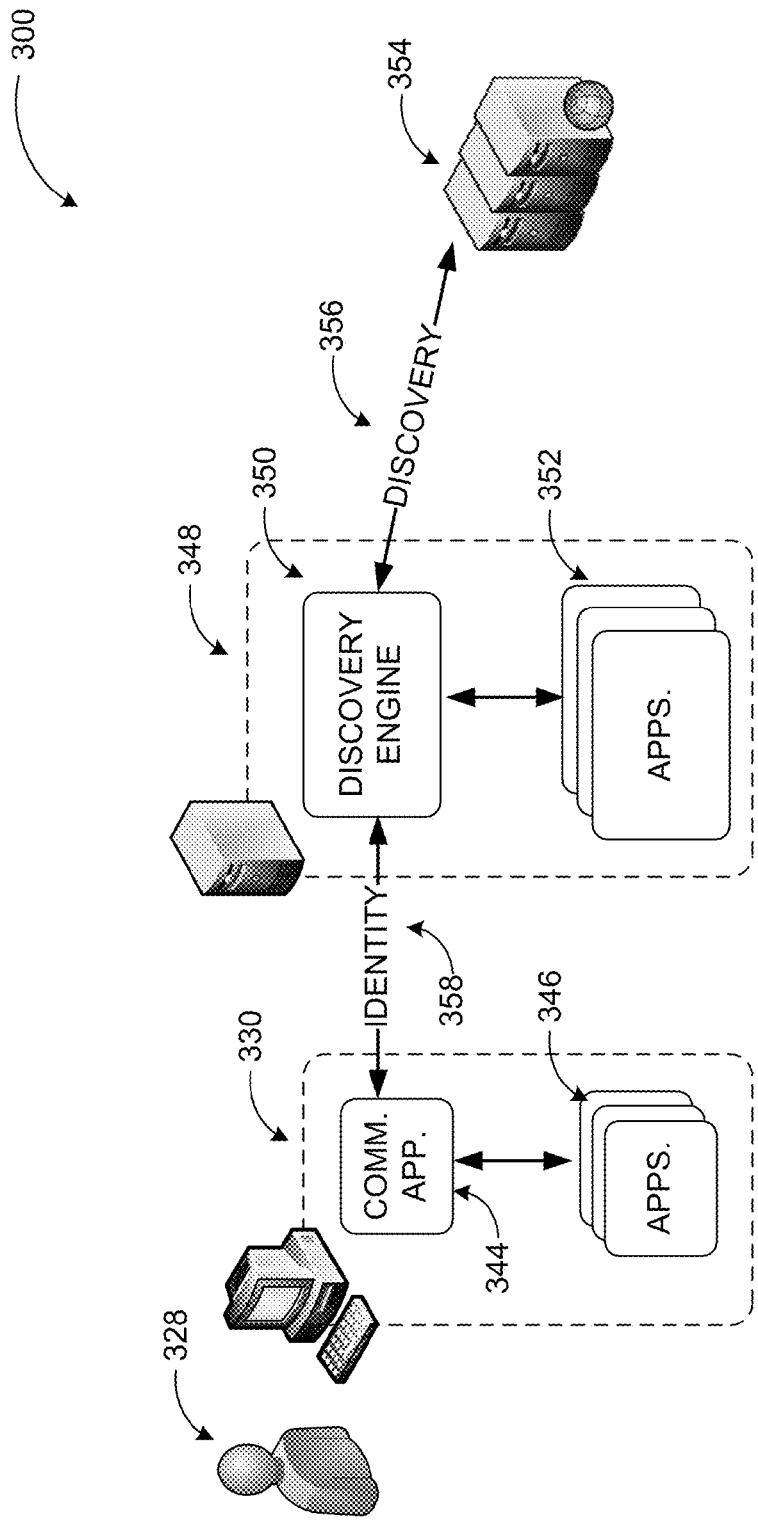
FIG. 3 is a diagram illustrating relevant software components and their interactions for performing unified web service discovery according to embodiments.

FIG. 3 is a diagram illustrating relevant software components and their interactions for performing unified web service discovery according to embodiments. A system according to embodiments provides common auto-discovery of various web services under different types of deployments described above, enables location of endpoint addresses of the web services, enables determination of authentication schemes supported by those endpoints, and selects a secure authentication scheme based on the availability of a compatible credential type.

The discovery of the web service location (e.g. base Uniform Resource Locator "URL") may be accomplished via various methods including, but not limited to, Domain Name System Server (DNS SRV) lookup, Dynamic Host Configuration Protocol (DHCP) option 43, or in-band provisioning from a unified communication system registrar after a user signs in. Proprietary discovery mechanisms such as Exchange Web Services® (EWS) discovery by Microsoft Corp. of Redmond, Wash. may also be employed.

Bindings (tuple of endpoint address, authentication scheme, and supported operation(s)) may be auto-discovered via a standardized protocol such as Web Services Meta Data Exchange specification (WS-MEX) or through comparable means. For example, EWS auto-discover service may use specific Hypertext Transport Protocol (HTTP) headers as indication of whether a server supports WSS authentication scheme. Once discovered, a metadata description object may be used to manage bindings. The objects may be cached to improve the performance by reducing network traffic and unnecessary MEX document parsing.

Returning to the example configuration illustrated in diagram 300, user 328 may access a variety of web services client 330. Client 330 may facilitate interactions with an enhanced communication system such as a unified communication service 348 through communication application 344. Communication application 344 itself may consume and provide some of the web services to user 328. Alternatively, a number of applications 346 executed on client 330 may also consume other web services. For example, a browsing application may utilize web search services, a word processing application may utilize web-based document sharing services, a spreadsheet program may utilize various data sources available and searchable through the web.

A typical interaction may begin with an identity 358 of user 328 being provided to unified communication service 348. This may be a login of the user, an inferred identity of the user, or similar identification(s). In addition to providing communication services, unified communication service 348 may include applications 352, which may provide web services and/or consume web services on behalf of user 328. For example, one of the applications 352 may manage a web-based document sharing service within an enterprise network. As part of the service, the application may interact with other web services on or off the enterprise network and combine those services with its own document sharing service. On the other hand, another one of applications 352 may provide a "pure" web service that is consumed by one of the applications 346 on client 330.

Upon receiving identity 358 associated with user 328, discovery engine 350 of the unified communication service 348 may determine is any sub-identities are associated with the user. Users in today's systems commonly have multiple identities associated with different web services (e.g. one for a social networking site, one for a data exchange service, one for a document sharing service, etc.). The sub-identities may be determined through a look-up operation, by inferring from user credentials (e.g. user email address), by performing a derivation algorithm (e.g. user login may be decrypted to derive one or more identities), and similar ones. Once the identity(ies) are determined, discovery engine 350 may begin the discovery process 356 determining services associated with the identities, locations of service providers 354 (e.g. URLs), authentication types supported by the service providers, operation types supported by the service providers, and comparable parameters. The discovered information may then be provided to consuming applications on unified communication service 348 and/or client 330 as bindings in metadata as described above.

Thus, a single framework for providing a variety of web services through the unified communication service 348 is established employing the discovery engine 350. The discovery process may be performed on-demand (e.g. upon user log-in), at random intervals, or at periodic intervals. Results of the discovery process may be cached and updated to improve system resource usage and user experience.

The example systems in FIGS. 1, 2, and 3 have been described with specific servers, client devices, software modules, and interactions. Embodiments are not limited to systems according to these example configurations. A unified web service discovery model may be implemented in configurations employing fewer or additional components and performing other tasks. Furthermore, specific protocols and interfaces have been discussed in conjunction with describing embodiments above. Embodiments are also not restricted to those examples. Other protocols, exchanges, an interfaces may be implemented in a similar manner using the principles described herein.

Figure 4:
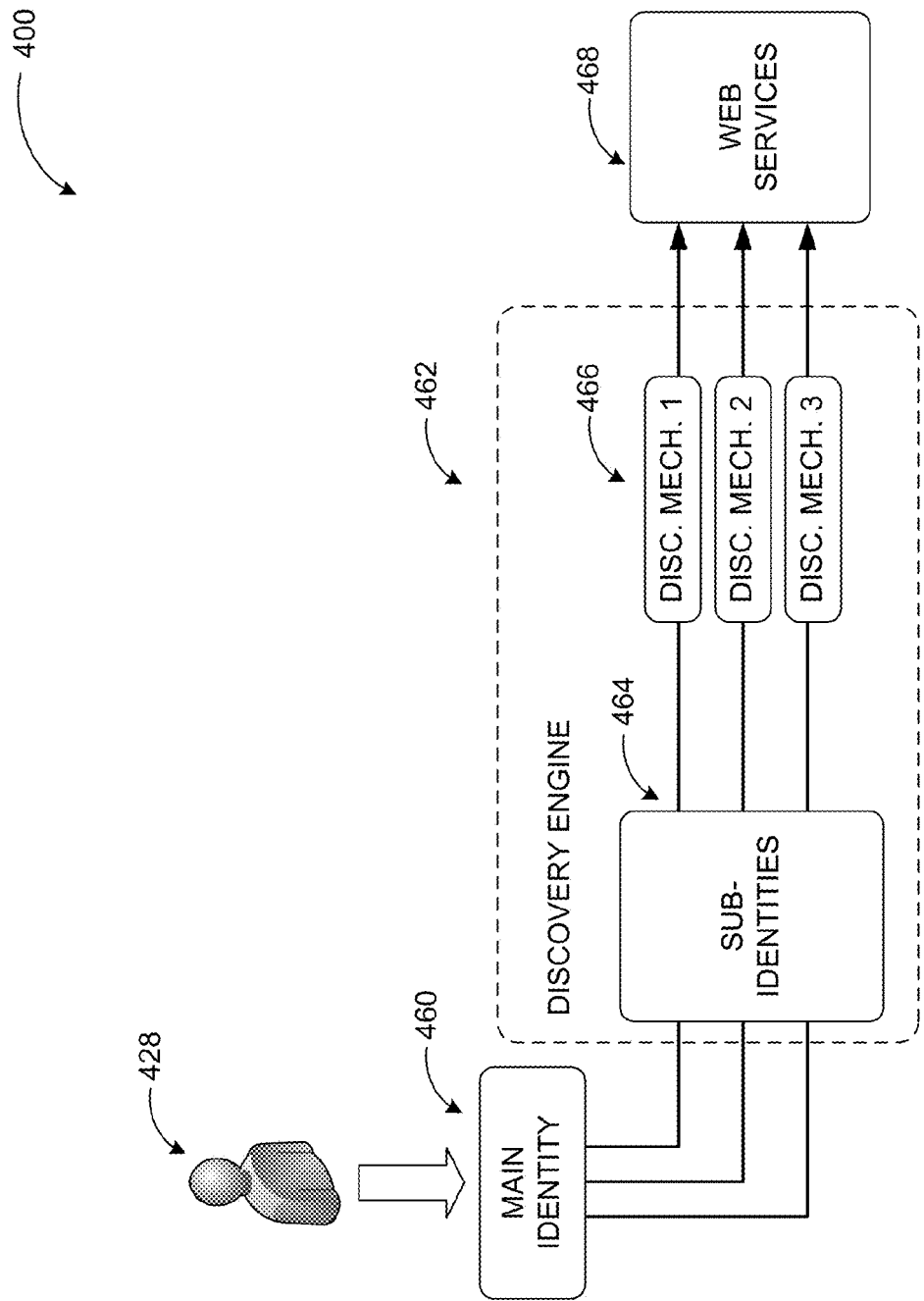
FIG. 4 illustrates how different sub-identities may be determined from a main identity for a user and different web service discovery mechanisms may be used for each sub-identity in a system according to embodiments.

FIG. 4 illustrates how different sub-identities may be determined from a main identity for a user and different web service discovery mechanisms may be used for each sub-identity in a system according to embodiments. In diagram 400, user 428 may employ a main identity (e.g. a login, username/password, certificates, personal identification numbers, and comparable ones) for accessing the communication service that includes discovery engine 462. User 428 may have multiple identities associated with different web services as discussed above. These sub-identities (464) may be determined from the main identity 460 through a look-up operation, by inferring from user credentials (e.g. user email address), or by executing a derivation algorithm. For example, the user login may encrypt a number of identities, which may be derived from the main identity through decryption. Once the sub-identities 464 are determined, discovery engine 462 may employ different (or same) discovery mechanisms 466 to discover web services 468 associated with the individual sub-identities. The discovered information may include locations of service providers, authentication types supported by the service providers, operation types supported by the service providers, and comparable parameters.

According to other embodiments, user 428 may provide at least some of the sub-identities 464 directly. The discovery may be performed on-demand, randomly, or periodically as described above. The discovery schedule, whether or not the discovered information is to be cached, and associated discovery mechanisms may be determined based on the individual sub-identities. The identity information (main and sub-identities) may be stored in volatile memory or persisted across application restarts by using a system resource like the registry, a file, and/or a credential manager Application Programming Interface (API). The credentials may be encrypted for security.

Figure 5:
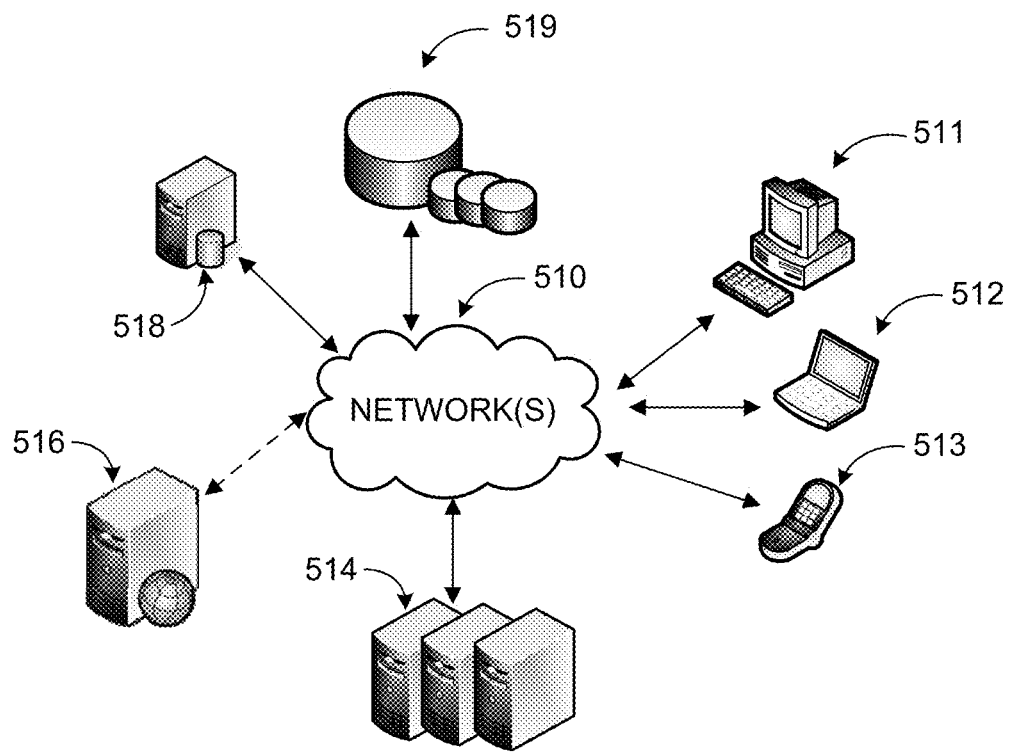
FIG. 5 is a networked environment, where a system according to embodiments may be implemented.

FIG. 5 is an example networked environment, where embodiments may be implemented. A platform providing unified web service discovery may be implemented via software executed over one or more servers 515 such as a hosted service. The platform may communicate with client applications on individual computing devices such as a smart phone 513, a laptop computer 512, or desktop computer 511 (client devices') through network(s) 510.

As discussed above, client applications executed on any of the client devices 511-513 may provide user identity to a service executed in a distributed manner on the servers 514 or in a centralized manner on individual server 516. The service may determine any sub-identities associated with the user, web services associated with those identities, and discover the web service providers, authentication types, operation types, etc. employing one or more discovery methods. The service may retrieve relevant data from data store(s) 519 directly or through database server 518, and provide the requested web service to the user(s) through client devices 511-513.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a framework for unified web service discovery. Furthermore, the networked environments discussed in FIG. 5 are for illustration purposes only. Embodiments are not limited to the example applications, modules, or processes.

Figure 6:
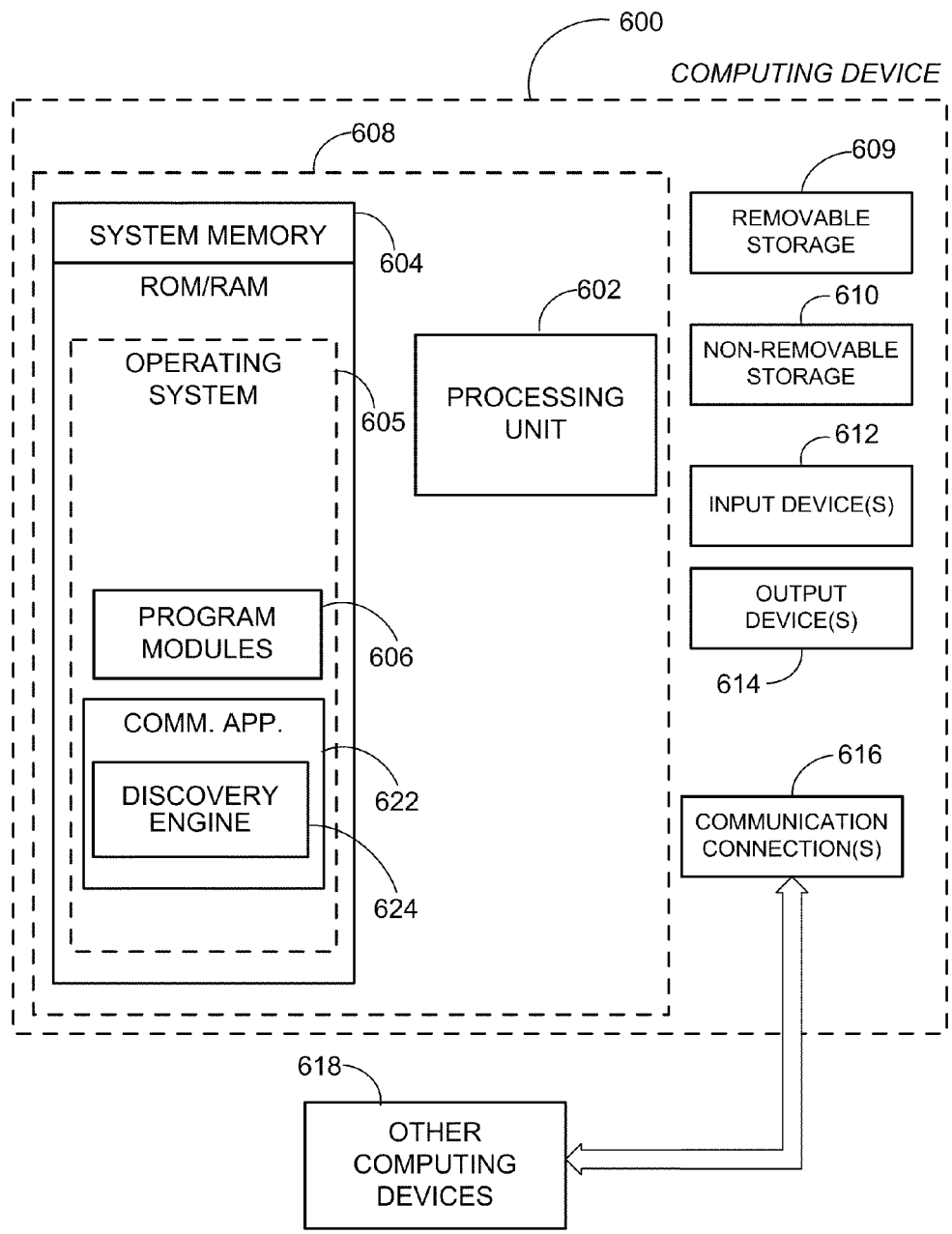
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be a client device executing a client application capable of web service discovery or a server executing a service capable of web service discovery according to embodiments and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, web service capable communication application 622, and discovery engine 624.

Communication application 622 may be any application that facilitates communication between other applications and/or modules on computing device 600 and servers relevant to requested web services. Discovery engine 624 may facilitate the user identity based automated web service discovery operations as discussed previously. Communication application 622 and discovery engine 624 may be separate applications or an integral component of a hosted service that provides enhanced communication services to client devices. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, other web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
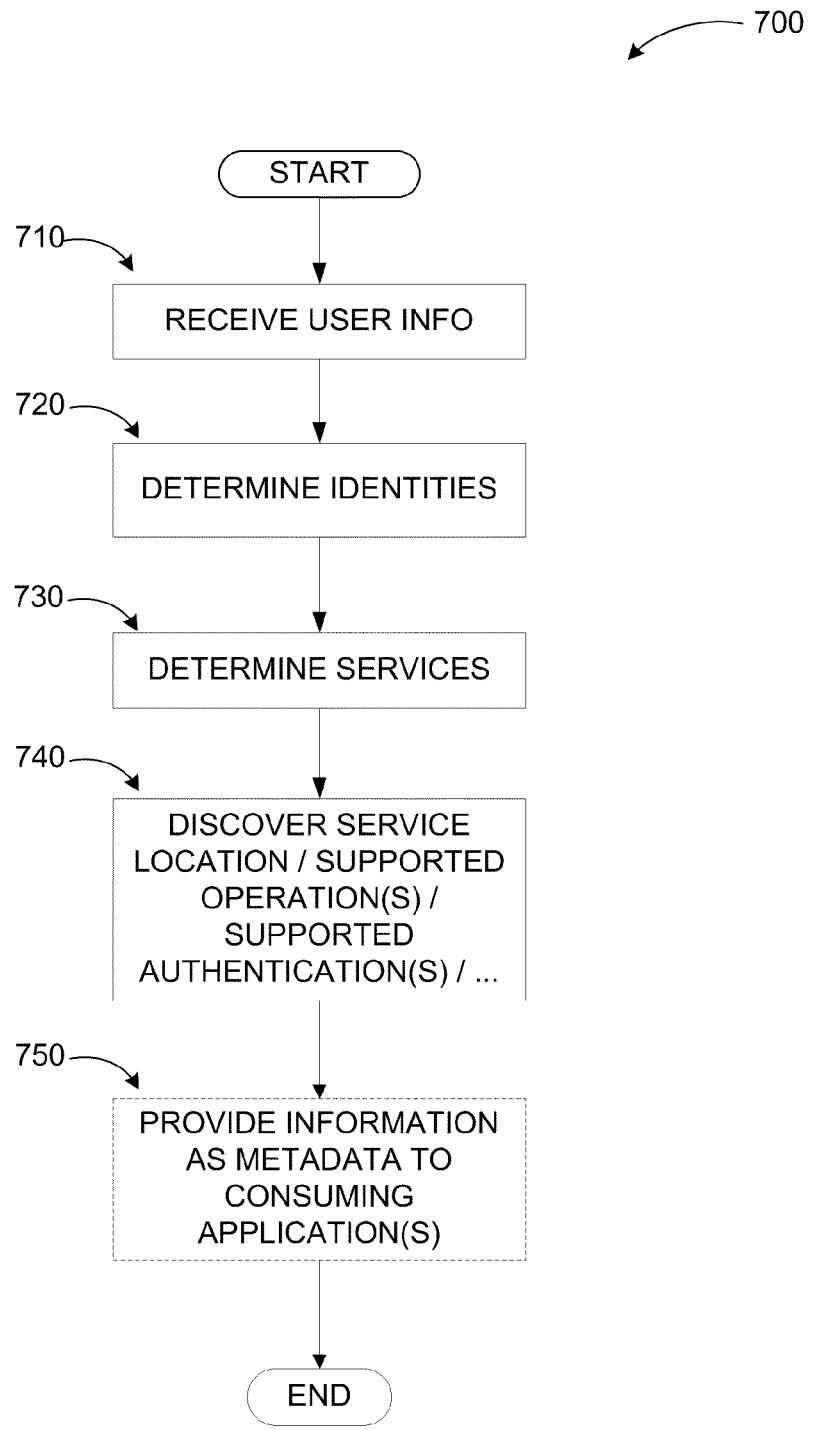
FIG. 7 illustrates a logic flow diagram for a process of providing unified web service discovery according to embodiments.

FIG. 7 illustrates a logic flow diagram for a process 700 of providing unified web service discovery according to embodiments. Process 700 may be implemented as part of a server or client application participating in an enhanced communication system.

Process 700 begins with operation 710, where user information is received. The user information may include a user's main identity associated with the system, a login, or other information from which the user's main identity may be derived. At operation 720, the user's sub-identities, if any, may be determined. This may be accomplished through querying a credential database, searching various data sources, or even an algorithm that derives the sub-identities from the main identity.

Operation 720 may be followed by operation 730, where web services associated with the user's identity(ies) are determined. The determination process may also involve querying one or more databases, inferring from user credentials, and comparable methods as discussed previously. At operation 740, location (i.e. resource) for each web service, operations supported by the resource providing each webs service, authentication types supported by each web service, and similar parameters may be discovered. Depending on the web service and resource type (e.g. enterprise-based or cloud-based), each discovery method may be different or the same. When the discovery operations are completed, the collected information may be provided as metadata to consuming application(s) on the client device or the server facilitating the services at optional operation 750.

The operations included in process 700 are for illustration purposes. Unified web service discovery may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed in a computing device to provide unified web service discovery, the method comprising:
    receiving information associated with a user;
    determining an identity associated with the user based on the received information, wherein the received information includes one or more of: a telephone number, a personal identification number, a Session Initiation Protocol (SIP) identifier, and a Uniform Resource Identifier (URI);
    receiving one or more sub-identities directly from the user;
    processing the identity through a derivation algorithm to identify the one or more sub-identities, wherein the derivation algorithm decrypts the identity to derive the one or more sub-identities;
    determining a web service associated with the identity based on a user demand;
    discovering information associated with a provider of the web service, wherein the information includes a location of the provider and an operation supported by the provider for the web service;
    providing the discovered information associated with the provider of the web service as metadata bindings to at least one consuming application associated with the user;
    enabling the at least one consuming application to select an authentication scheme based on an availability of a compatible identity associated with the user; and
    providing the authentication scheme to the at least one consuming application through a framework.

2. The method of claim 1, further comprising:
    providing the discovered information associated with the provider of the web service as metadata to the at least one consuming application associated with the user.

3. The method of claim 1, wherein distinct discovery mechanisms are employed for different web services based on a type of the provider.

4. The method of claim 1, wherein the one or more sub-identities are determined employing at least one from a set of: a look-up operation and an inference from user credentials.

5. The method of claim 1, wherein the web service is discovered based on one of: a predefined period and a random interval.

6. The method of claim 5, wherein discovery results are cached to optimize system resource usage.

7. The method of claim 6, wherein the at least one from a set of: a schedule of discovery for the web service, whether the discovery results are cached, and discovery mechanisms are determined based on each of the one or more sub-identities.

8. The method of claim 1, wherein the location of the provider includes a Uniform Resource Locator (URL) for the provider, and one of: a Domain Name System Server (DNS SRV) lookup, a Dynamic Host Configuration Protocol (DHCP) option 43, and in-band provisioning from a system registrar is employed to discover the location.

9. A unified communication system that employs unified web service discovery, the unified communication system comprising:
    a server configured to:
        manage communications between internal and external resources of the unified communication system and client applications;

a client device executing a client application, wherein the client application is configured to:
provide a user credential to a discovery engine; and
the discovery engine configured to:
determine at least one identity associated with the user based on the user credential, wherein the user credential includes one or more of: a telephone number, a personal identification number, a Session Initiation Protocol (SIP) identifier, and a Uniform Resource Identifier (URI);
process the at least one identity through a derivation algorithm to identify one or more sub-identities, wherein the derivation algorithm decrypts the at least one identity to derive the one or more sub-identities;
discover web service parameters for web services associated with the at least one identity based on a user demand and by employing one or more discovery mechanisms in a unified manner;
generate metadata bindings based on the discovered web service parameters;
enable one of: the client application, a consuming application executed on the server, and a consuming application executed on the client device to select an authentication scheme based on an availability of a compatible identity associated with the user; and
provide the metadata bindings to one of: the client application, the consuming application executed on the server, and the consuming application executed on the client device.

10. The unified communication system of claim 9, wherein the web service parameters include: locations of web service providers, authentication types supported by the web service providers, and operations supported by the web service providers.

11. The unified communication system of claim 9, wherein the web services are provided by at least one from a set of: the server, another server within the unified communication system, and a system external to the unified communication system.

12. The unified communication system of claim 9, wherein the user credential includes one of: a login, a username/password combination, a certificate, and an email address.

13. The unified communication system of claim 9, wherein a discovery schedule is determined based on each identity, and the discovered parameters are stored in one of a volatile memory and a persistent storage including one of: a system registry, a file, and a credential manager Application Programming Interface (API).

14. The unified communication system of claim 9, wherein the unified communication system is one of: enterprise-based, cloud-based, and a combination of enterprise-based and cloud-based.

15. A computer-readable memory device with instructions stored thereon to provide unified web service discovery, the instructions comprising:
receiving a user credential in a system;
determining a plurality of identities associated with the user based on the credential, wherein the user credential includes one or more of: a telephone number, a personal identification number, a Session Initiation Protocol (SIP) identifier, and a Uniform Resource Identifier (URI);
receiving one or more sub-identities directly from the user;
processing the identities through a derivation algorithm to identify the one or more sub-identities, wherein the derivation algorithm decrypts the identities to derive the one or more sub-identities;
determining a plurality of web services associated with the identities based on a user demand;
discovering information associated with providers associated with the plurality of web services, wherein the information includes a location of the providers and operations supported by the providers employing one or more discovery mechanisms in a unified manner;
providing the discovered information associated with the providers of the plurality of web services as metadata bindings to at least one consuming application associated with the user;
enabling the at least one consuming application to select an authentication scheme based on an availability of a compatible identity associated with the user; and
providing the metadata bindings to the at least one consuming application through a framework.

16. The computer-readable memory device of claim 15, further comprising:
repeating the discovery following one of: a random period, a predefined period, and the user demand based on the plurality of web services to be discovered; and
caching results of the discovery based on one of: one of the identities and the plurality of web services to be discovered.

17. The computer-readable memory device of claim 15, wherein the discovery is performed employing at least one of a standardized mechanism and a proprietary mechanism.

18. The computer-readable memory device of claim 15, wherein the plurality of web services includes at least one from a set of: a search service, a document sharing service, and a data sharing service.

* * * * *